US006722841B2

(12) United States Patent
Haas

(10) Patent No.: US 6,722,841 B2
(45) Date of Patent: Apr. 20, 2004

(54) SEED BOX INVERTER

(75) Inventor: Richard P. Haas, LeRoy, IL (US)

(73) Assignee: D B H LLC, LeRoy, IL (US)

(*) Notice: Subject to any disclaimer, the term of this patent is extended or adjusted under 35 U.S.C. 154(b) by 238 days.

(21) Appl. No.: 10/002,239

(22) Filed: Nov. 15, 2001

(65) Prior Publication Data

US 2003/0091419 A1 May 15, 2003

(51) Int. Cl.[7] .......... B65G 65/23
(52) U.S. Cl. .......... 414/422; 414/421; 414/607
(58) Field of Search .......... 414/420, 421, 414/422, 607, 608, 717, 912

(56) References Cited

U.S. PATENT DOCUMENTS

| | | | | | |
|---|---|---|---|---|---|
| 2,468,326 | A | | 4/1949 | Gleason | 214/113 |
| 2,764,307 | A | | 9/1956 | Kughler | 214/620 |
| 2,796,283 | A | | 6/1957 | Grazier | 294/73 |
| 2,827,189 | A | * | 3/1958 | Knudstrup | 414/607 |
| 2,860,797 | A | * | 11/1958 | Wilcox | 414/420 |
| 2,971,662 | A | * | 2/1961 | Dunham | 414/420 |
| 3,670,912 | A | | 6/1972 | Dunbar | 214/313 |
| 3,688,933 | A | | 9/1972 | Rumell | 214/621 |
| 3,893,579 | A | | 7/1975 | Glewwe | 214/313 |
| 3,895,722 | A | * | 7/1975 | Pluntz | 414/766 |
| 4,077,613 | A | * | 3/1978 | Wilson | 366/213 |
| 4,272,217 | A | * | 6/1981 | Sefcik | 414/420 |
| 4,325,669 | A | | 4/1982 | Schafer | 414/786 |
| 4,561,822 | A | | 12/1985 | Schmook | 414/422 |
| 4,664,576 | A | * | 5/1987 | Coe | 414/791.3 |
| 4,708,576 | A | | 11/1987 | Conley | 414/607 |
| 4,838,752 | A | * | 6/1989 | Bryant | 414/421 |
| 4,921,389 | A | * | 5/1990 | O'Daniel | 414/420 |
| 5,009,565 | A | * | 4/1991 | Esau | 414/607 |
| 5,429,490 | A | | 7/1995 | Myers et al. | 425/436 R |
| 5,575,608 | A | * | 11/1996 | Yau et al. | 414/607 |
| 5,641,188 | A | | 6/1997 | Phillips | 294/68.27 |

* cited by examiner

*Primary Examiner*—Eileen D. Lillis
*Assistant Examiner*—Charles A. Fox
(74) *Attorney, Agent, or Firm*—Emrich & Dithmar

(57) ABSTRACT

Apparatus adapted for attachment to a conventional lift device such as a forklift or an end loader, or the like, includes a pair of movable side arms each attached to a respective end of a cross member. Each side arm has attached thereto a respective engaging member for engaging lateral ribs of a first seed box for lifting the seed box. The apparatus further includes a pivoting connection for rotating the first seed box to an inverted orientation for positioning on a second seed box in a nested configuration for storage. The first seed box may also be positioned on the second seed box in a stacked configuration for receiving and storing seed by engaging and lifting the first seed box, rotating the first seed box to an upright orientation, and placing the first seed box on the second seed box.

16 Claims, 10 Drawing Sheets

SEED BOX INVERTER

FIELD OF THE INVENTION

This invention relates generally to the handling of large boxes and is particularly directed to an arrangement adapted for attachment to a conventional lift device such as a forklift, an end loader, or the like, for raising, manipulating and positioning a first seed box in either a first nested position on a second smaller seed box for storage or in a second stacked position on the second seed box for receiving and storing seed.

BACKGROUND OF THE INVENTION

The agricultural seed industry is rapidly moving away from the traditional bagged seed approach and toward the bulk handling of seed. To this end, large boxes made of high strength plastic are used for receiving and storing the seed prior to planting. In one approach, the boxes are of two different sizes to allow a first box open at the top and bottom to be positioned on a smaller second box in a stacked array to receive a large quantity of seed, or to be positioned over the second box in a nested configuration when inverted for compact storage of the boxes when not in use. The boxes themselves are typically quite heavy, requiring at least two workers to position the boxes in either the stacked configuration for receiving seed or in the nested configuration for storage.

Each of the paired boxes is typically capable of holding 50 bags of seed beans which weigh on the order of 50 lbs. each. Each box weighs in the range of 300 to 400 lbs. empty which makes it difficult for only two workers to handle and position the boxes in either the stacked or nested configuration. Frequently a third worker is required to handle these cumbersome, bulky containers. The relatively large weight and size of the boxes also increases the possibility of accidental injury to the workers handling the boxes and possible damage to the boxes themselves. Finally, the seed boxes are typically transported from the seed dealer to the customer's location for use in storing seed and then returned to the seed dealer for storage after use. Manual handling of these large, heavy seed boxes makes their transport difficult, labor intensive and expensive.

The present invention addresses the aforementioned limitations of the prior art by providing apparatus adapted for attachment to a conventional lift device, such as a forklift, an end loader, or the like, for lifting, orienting and positioning bulk seed boxes and arranging a pair of such boxes in a stacked configuration for receiving and storing seed, or in a nested configuration wherein a larger seed box is placed over a smaller seed box for storage after use. However, while the present invention is described primarily in terms of use with seed boxes such as used in agriculture, it may be used for handling virtually any type of large, bulky container which can be lifted, manipulated and positioned by securely engaging outer portions of the box's opposed, lateral walls.

OBJECTS AND SUMMARY OF THE INVENTION

Accordingly, it is an object of the present invention to provide apparatus for arranging a pair of large seed boxes in either a nested configuration for storage or a stacked configuration for receiving and storing seeds.

It is another object of the present invention to facilitate the handling of large boxes having projections on outer lateral walls thereof by means of a conventional lifting device, such as a forklift, end loader, or the like.

Yet another object of the present invention is to provide an arrangement for positioning a first large box having open upper and lower portions on a second smaller box having an open upper portion and a closed lower portion in either a first nested, telescoping configuration for storage or a second vertically stacked configuration for receiving and storing virtually any type of material.

A further object of the present invention is to provide for the lifting, manipulating and positioning of large heavy boxes safely and easily by a single worker.

A still further object of the present invention is to provide portable apparatus adapted for use with conventional lifting devices for handling large containers which can be combined in a stacked array for receiving and storing material or arranged in a nested configuration for storage when not in use.

This invention is intended for use with a pair of fork elements attached to a lift device and includes apparatus for handling a generally box-like first container adapted for positioning on a generally box-like second container in a first stacked configuration wherein the first container is upright for receiving and storing material or in a second nested configuration wherein the first container is inverted and the second container is disposed in an open upper portion of the inverted first container, the first container having first and second opposed lateral walls with plural spaced ribs disposed on respective outer surfaces thereof, the apparatus comprising: a frame comprising a cross member and first and second side arms each attached to a respective opposed end of the cross member; first and second attachment brackets affixed to the frame and adapted to receive a respective fork element of the lift device for lifting the frame; first and second engaging members respectively disposed on the first and second side arms for securely engaging respective ribs on the outer surfaces of first and second lateral walls of the first container; and pivot means coupled to the frame for permitting rotation of the first container when lifted between the upright and inverted orientations for positioning on the second container in the first stacked configuration or the second nested configuration.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
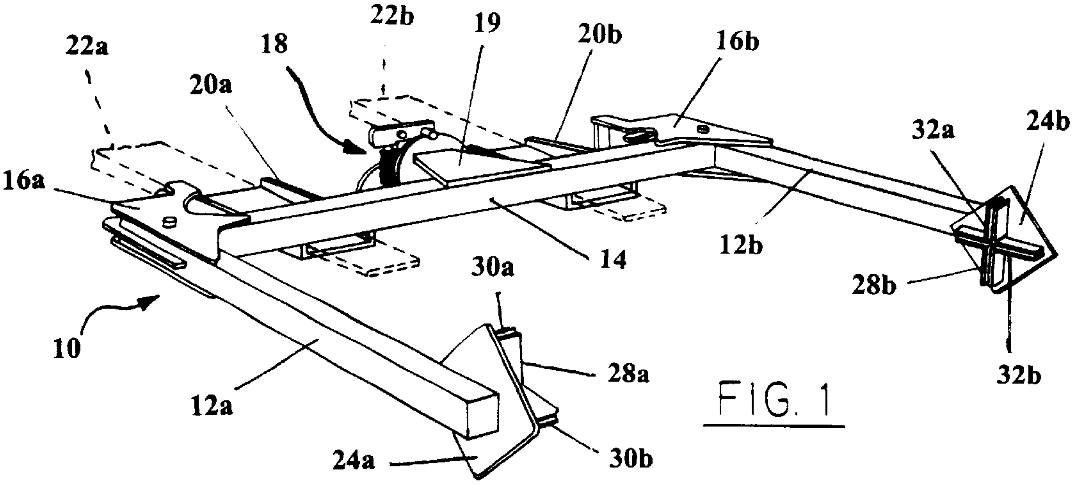
FIG. 1 is a perspective view of one embodiment of a seed box inverter in accordance with the principles of the present invention.
Figure 2:
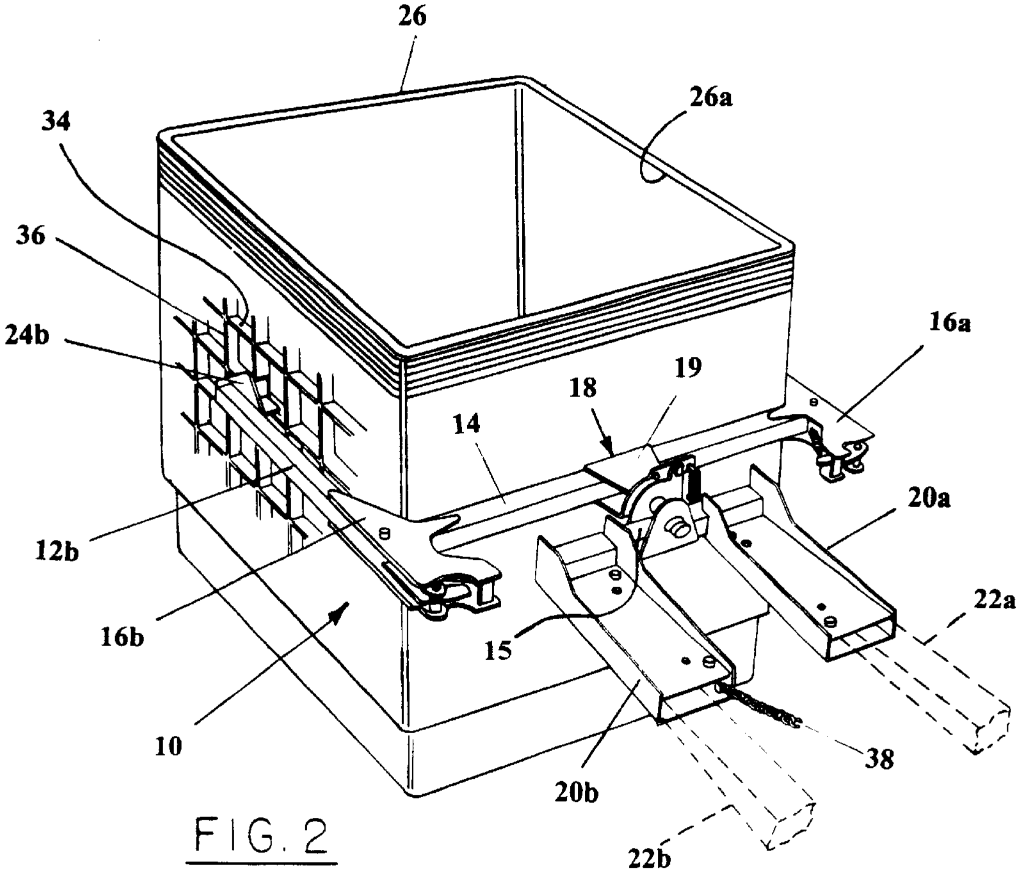
FIG. 2 is a perspective view of the seed box inverter of FIG. 1 showing the manner in which the seed box inverter engages a seed box for lifting, manipulating and positioning the seed box in accordance with the present invention.
Figure 3:
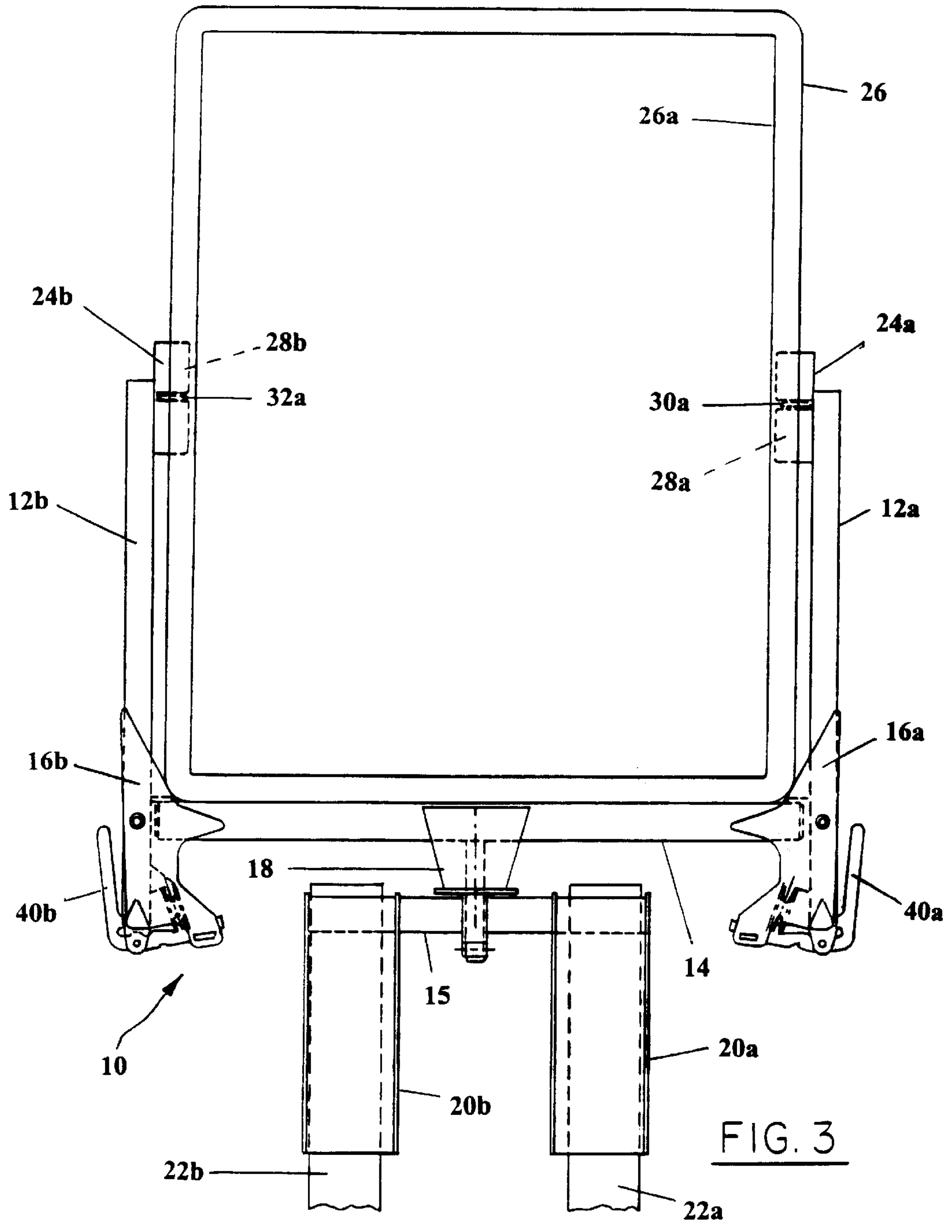
FIG. 3 is a top plan view showing the seed box inverter engaging outer portions of opposed lateral walls of a seed box in accordance with the present invention.
Figure 6:
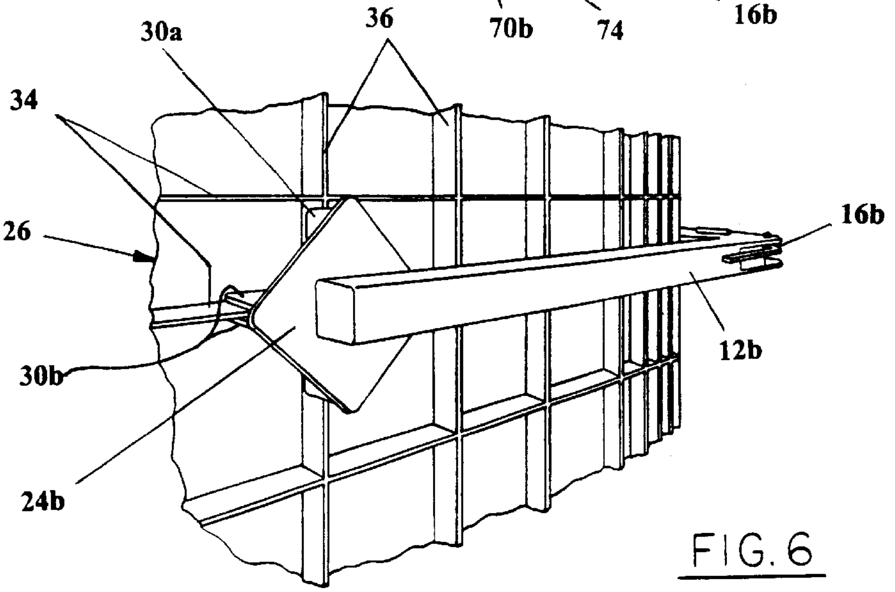
FIG. 6 is a partial perspective view showing details of a manner in which a side arm of the seed box inverter engages the outer surface of a lateral wall of a seed box.

Referring to FIG. 1, there is shown a perspective view of one embodiment of a seed box inverter 10 in accordance with the present invention. FIGS. 2 and 3 are perspective and top plan views, respectively, showing the manner in which the seed box inverter 10 of FIG. 1 engages the outer portions of a pair of opposed lateral walls of a seed box 26 for lifting, manipulating and positioning the seed box in accordance with the present invention. FIG. 6 is a partial perspective view showing additional details of the manner in which the side arm 12*b* of the seed box inverter 10 engages the outer surface of a lateral wall of a seed box 26.

The seed box inverter 10 includes first and second generally linear, elongated side arms 12*a* and 12*b*. One end of each of the first and second side arms 12*a*, 12*b* is pivotally coupled to a respective end of a first cross member 14 by means of first and second locking mechanisms 16*a* and 16*b*, respectively. The first and second locking mechanisms 16*a*, 16*b* allow the first and second side arms 12*a*, 12*b*, respectively, to be pivotally displaced relative to the first cross member 14 as described in detail below. Each of the first and second side arms 12*a*, 12*b* and the first cross member 14 is preferably comprised of a high strength tubular steel. Respectively disposed on the distal ends of the first and second side arms 12*a*, 12*b* are first and second engaging brackets 24*a* and 24*b*. Each of the first and second engaging brackets 24*a*, 24*b* is in the general form of a flat plate having on its inner surface plural projections forming elongated vertical and horizontal slots. Thus, disposed on the inner surface of the first engaging bracket 24*a* are plural projections 28*a* forming a vertical slot 30*a* and a horizontal slot 30*b*. Similarly, disposed on the inner surface of the second engaging bracket 24*b* are plural projections 28*b* forming elongated, linear vertical and horizontal slots 32*a* and 32*b*. Each of the first and second engaging brackets 24*a*, 24*b* is securely attached to the distal end of the first and second side arms 12*a*, 12*b*, respectively, by conventional means such as weldments or a nut and bolt combination.

Although FIG. 2 shows the outer surface of only one of the lateral walls of the seed box 26 as including plural ribs extending therefrom, the outer surfaces of each of the box's lateral walls is provided with these projecting ribs. These projecting ribs are not shown on the other lateral walls of the seed box 26 for the sake of simplicity. The outer projecting ribs on each of the lateral walls of the seed box 26 are arranged as plural spaced horizontal ribs 34 and plural spaced vertical ribs 36 as shown in FIGS. 2 and 6. The vertical and horizontal slots 32*a*, 32*b* of the second engaging bracket 24*b* are respectively adapted to engage respective ones of the vertical and horizontal ribs 36 and 34 on the outer surface of the seed box's lateral wall. The vertical and horizontal slots 30*a*, 30*b* on the first engaging bracket 24*a* are similarly adapted to securely engage vertical and horizontal ribs on the outer surface of the opposing lateral wall of the seed box 26, although this is not shown in the figure for simplicity. In this manner, when the first and second side arms 12*a*, 12*b* are displaced inwardly so that their respective engaging brackets 24*a*, 24*b* securely engage the projecting ribs on the outer surfaces of the box's opposed lateral walls, seed box 26 may be lifted and positioned as desired.

Figure 5:
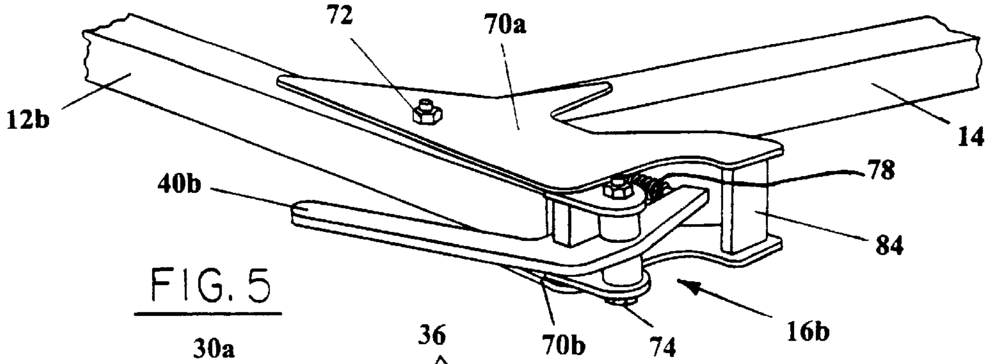
FIG. 5 is a perspective view showing a portion of the seed box including details of a side arm locking mechanism.
Figure 7:
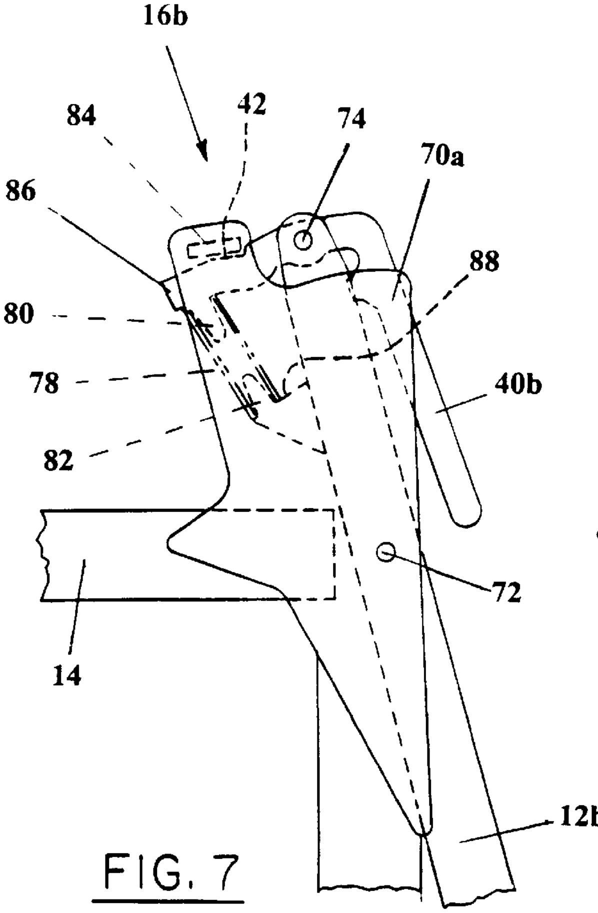
FIGS. 7 and 8 show details of the seed box inverter's side arm locking mechanism in the released position and in the box engaging position, respectively.
Figure 8:
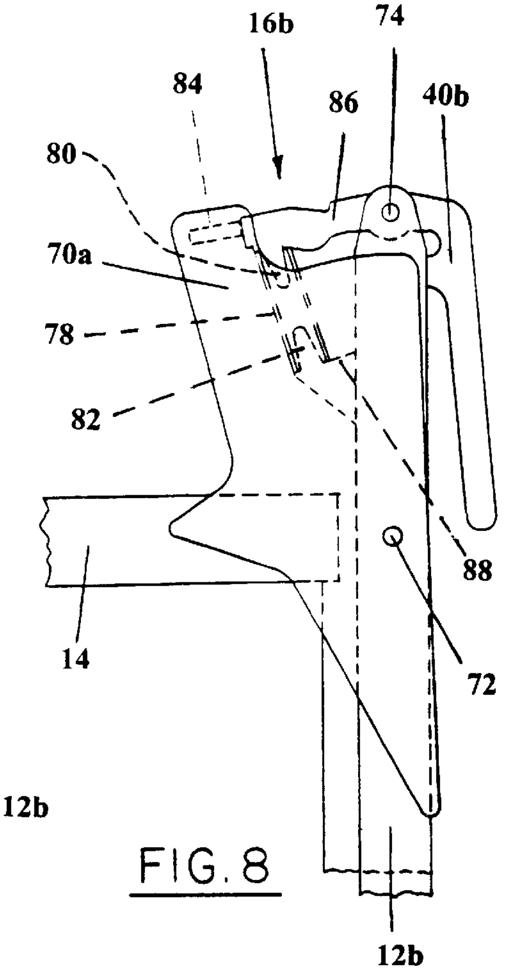

As described above, the first and second side arms 12*a*, 12*b* are respectively connected in a pivoting manner to respective ends of the first cross member 14 by means of first and second locking mechanisms 16*a* and 16*b*. Details of the second locking mechanism 16*b* are shown in the perspective view of FIG. 5 as well as in the top plan views (shown partially in phantom) of FIGS. 7 and 8. FIGS. 7 and 8 respectively show the second side arm 12*b* in the outwardly extended, non-engaging position and in the retracted, seed box engaging position. Details of the configuration and operation of the second locking mechanism 16*b* will now be described, it being understood that the first locking mechanism 16*a* is similarly configured and operates in a similar manner.

The second side arm 12*b* is connected to an end of the first cross member 14 by means of the combination of upper and lower mounting plates 70*a* and 70*b* and a first pivot pin 72. Pivot pin 72 allows the second side arm 12*b* to be displaced outwardly and inwardly to permit the engaging bracket attached to the distal end of the second side arm to be either displaced from or to engage the outer surface of a lateral wall of a seed box. The second side arm 12*b* is moved between the outwardly displaced, non-engaging position as shown in FIG. 7 and the inwardly displaced, engaging position shown in FIG. 8 by means of a release handle 40*b*. Release handle 40*b* is pivotally coupled to a proximal end of the second side arm 12*b* by means of a second pivot pin 74. Movement of the release handle 40*b* outwardly causes the second side arm 12*b* to move outwardly as shown in FIG. 7. Conversely, inward displacement of the second release handle 40*b* causes the second side arm 12*b* to move inwardly as shown in FIG. 8.

Disposed between and connected to the upper and lower mounting plate 70*a*, 70*b* is a locking member 84. An end of the release handle 40*b* engages the locking member 84 when the release handle is moved inwardly as shown in FIG. 8. This maintains the second side arm 12*b* in the inward position and in engagement with the outer surface of a lateral wall of a seed box. Similarly, when the release handle 40*b* is moved outwardly, the locking member 84 is positioned in a recessed portion 42 of the release handle 40*b* as shown in FIG. 7 to maintain the second side arm 12*b* in the extended position. In this position, the second side arm 12*b* does not engage the seed box. The locking mechanisms are of the off-center type and include a biasing arrangement for maintaining the locking mechanism and its associated side arm in either the extended position or in the retracted position. Thus, the second locking mechanism 16*b* includes a coiled spring 78. Coiled spring 78 is positioned between the movable release handle 40*b* and a fixed member 88 connected to the upper and lower mounting plate 70*a*, 70*b*. Coiled spring 78 engages and is maintained in position by first and second alignment pins 80 and 82 respectively extending from the second release handle 40*b* and the fixed member 88. Coiled spring 78 urges the second release handle 40*b* and the second side arm 12*b* in a clockwise direction as viewed in FIGS. 7 and 8 for maintaining the second side arm in either the outwardly extended position as shown in FIG. 7 or in the retracted position as shown in FIG. 8. The second side arm 12*b* is moved between these two positions by manually engaging the second release handle 40*b* and moving the release handle either outwardly or inwardly by overcoming the biasing force of the coiled spring 78.

Figure 4:
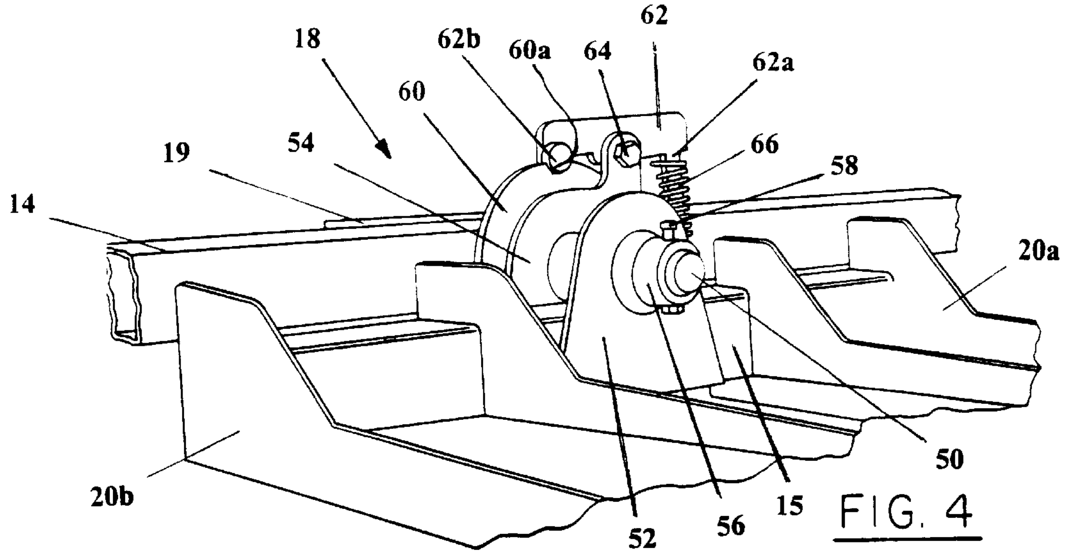
FIG. 4 is a partial perspective view of the seed box inverter showing details of a releasable pivot mechanism which allows the seed box inverter to invert a seed box.
Figure 9:
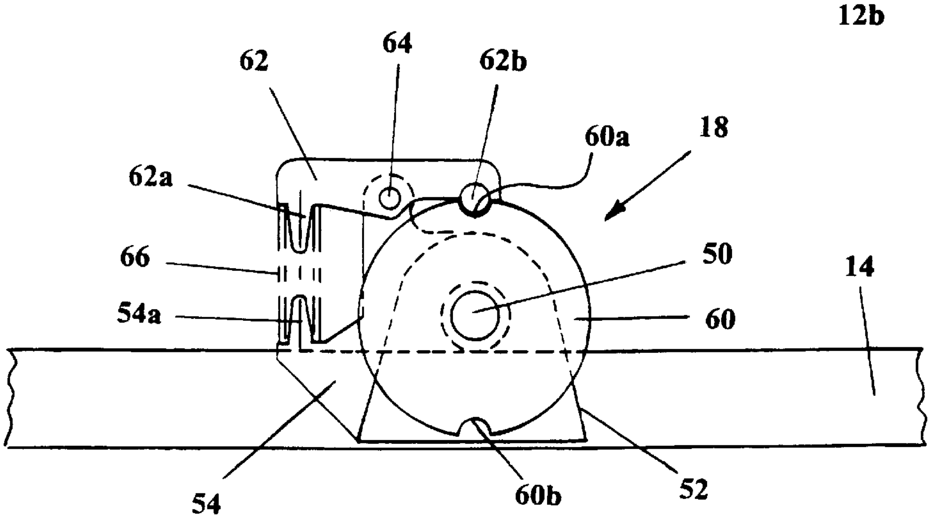
FIG. 9 shows additional details of the seed box inverter's releasable pivot mechanism used for inverting a seed box.

The first cross member 14 is pivotally coupled to a second cross member 15 as shown in FIG. 2 to permit the first cross member and the first and second side arms 12*a*, 12*b* attached thereto to be pivotally displaced relative to the second cross member. Details of a releasable pivot mechanism 18 pivotally coupling the first and second cross members 14, 15 are shown in the perspective and elevation views of FIGS. 4 and 9, respectively. Details of the releasable pivot mechanism 18 and the manner in which the combination of the first cross member 14 and first and second side arms 12*a*, 12*b* are pivotally displaced relative to the second cross member 15 will now be described.

The releasable pivot mechanism 18 includes a mounting bracket 19 connected to the first cross member 14 and first and second brackets 52 and 54 connected to the second cross member 15. Attached to the first mounting bracket 19 as well as to the first cross member 14 is a second mounting bracket 60. The second mounting bracket 60 as well as the first and second brackets 52 and 54 are each provided with a circular aperture, with the apertures of each of these brackets arranged in linear alignment. Inserted through the aligned apertures of the second mounting bracket 60 and the first and second brackets 52, 54 is a cylindrical pivot shaft 50. Pivot shaft 50 is maintained in position within these brackets by means of the combination of a mounting collar 56 and set screw 58 on one end, and by a similar combination on its other end, which is not shown in the figures for simplicity. Pivot shaft 50 allows the first cross member 14 to be pivotally displaced relative to the second cross member 15.

Opposed portions of the outer periphery of the second mounting bracket 60 are provided with respective notches, or recesses, 60*a* and 60*b*. Pivotally attached to the second bracket 54 by means of a connecting pin 64 is a locking shaft 62. Locking shaft 62 includes a locking shaft extension 62*a* inserted in a coiled spring 66. Coiled spring 66 urges the locking shaft 62 in a clockwise direction as viewed in FIG. 9. Coiled spring 66 engages and is maintained in position between the second bracket 54 and the locking shaft 62 by means of the aforementioned locking shaft extension 62*a* and extension 54*a* on the second mounting bracket 54. Disposed on one end of the locking shaft 62 is an engaging member 62*b*. Engaging member 62*b* is adapted for positioning within notches 60*a* and 60*b* located on the outer periphery of the second mounting bracket 60. Coiled spring 66 in contact with the locking shaft 62 urges the locking shaft's engaging member 62*b* downwardly in secure engagement with either the second mounting bracket's first notch 60*a* or its second notch 60*b*. With the locking shaft engaging member 62*b* positioned within the second mounting bracket's first notch 60*a*, the first cross member 14 and the first and second side arms attached thereto are securely maintained in an upright orientation. With the second mounting bracket 60 rotated 180° and the locking shaft's engaging member 62*b* positioned within the second mounting bracket's second notch 60*b*, the first cross member 14 and the first and second side arms attached thereto are securely maintained in an inverted orientation. It is in this manner that the releasable pivot mechanism 18 allows for pivoting displacement between the first and second cross members 14, 15 and the secure positioning of the first cross member relative to the second cross member in either an upright orientation or an inverted orientation.

Securely attached in a spaced manner to the second cross member 15 and disposed on opposed sides of the releasable pivot mechanism 18 are first and second attachment brackets 20*a* and 20*b* as shown in FIGS. 1 and 2. The first attachment bracket is adapted to receive and securely engage a first fork 22*a*, while the second attachment bracket 20*b* is adapted to receive and securely engage a second fork 22*b*, where the two forks are shown in dotted line form in the figures. Respective inner portions of the first and second attachment brackets 20*a* and 20*b* are preferably tapered to engage a respective fork in a tight-fitting manner. First and second forks 22*a*, 22*b* may be attached to a conventional lift device such as a forklift, an end loader, or the like, for permitting the seed box inverter 18 and a seed box 26 attached thereto to the lifted, manipulated and positioned as desired. The releasable pivot mechanism 18 described above allows the combination of the first cross member 14 and first and second side arms 12*a*, 12*b*, and a seed box 26 engaged by the side members, to be pivotally displaced about pivot shaft 50 relative to the second cross member 15 and the first and second attachment brackets 20*a*, 20*b* connected thereto. The combination of the aforementioned locking shaft 62 and its engaging member 62*a* together with the second mounting bracket 60 and its opposed notches 60*a* and 60*b* allow the first cross member 14 and first and second side arms 12*a*, 12*b* and a seed box 26 engaged by the side arms to be securely and stably maintained in either an upright orientation as shown in FIG. 2 or in an inverted orientation wherein the box is rotated 180° about the axis of the pivot shaft 50. FIG. 2 shows a safety chain 38 attached to the second attachment bracket 20*b*. The other end of the safety chain 38 is securely attached to the lifting device such as a forklift or an end loader to prevent the first and second attachment brackets 20*a*, 20*b* from being respectively removed from the first and second forks 20*a*, 20*b*. This eliminates the possibility of the seed box inverter 10 and a seed box 26 engaged by the inverter from becoming separated from the lift device such as when the seed box is raised.

Figure 10:
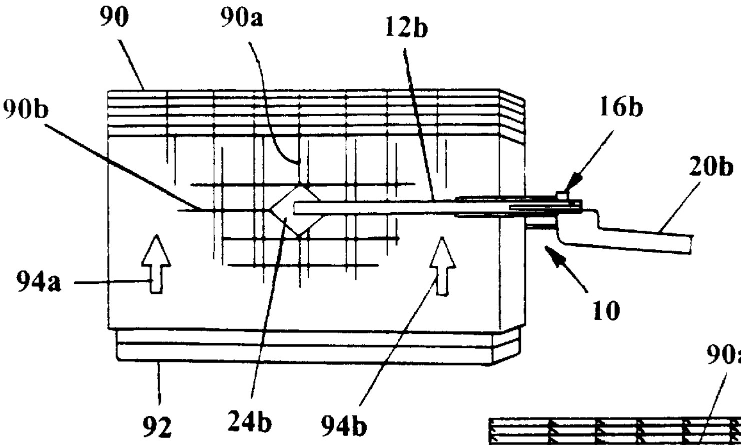
FIGS. 10 through 14 show the sequence of steps involved in removing a first larger seed box from a nested configuration on a second smaller seed box and positioning the first seed box on the second seed box in a stacked configuration for receiving and storing seed.
Figure 11:
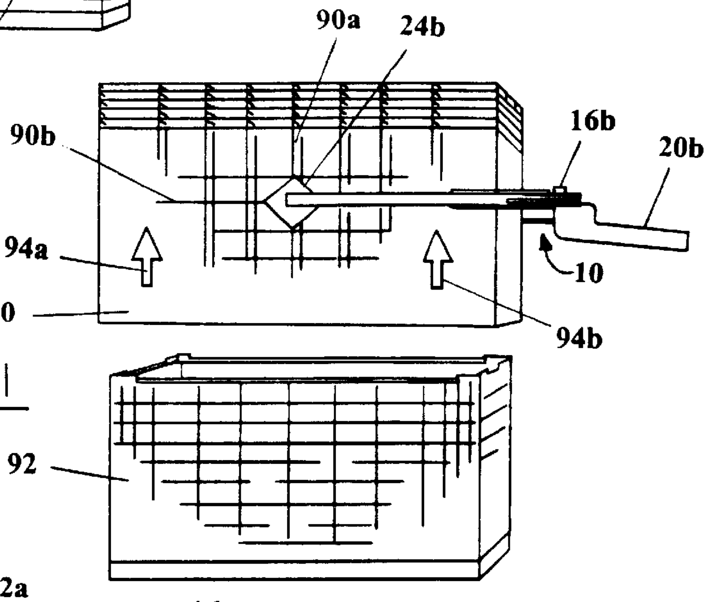
Figure 12:
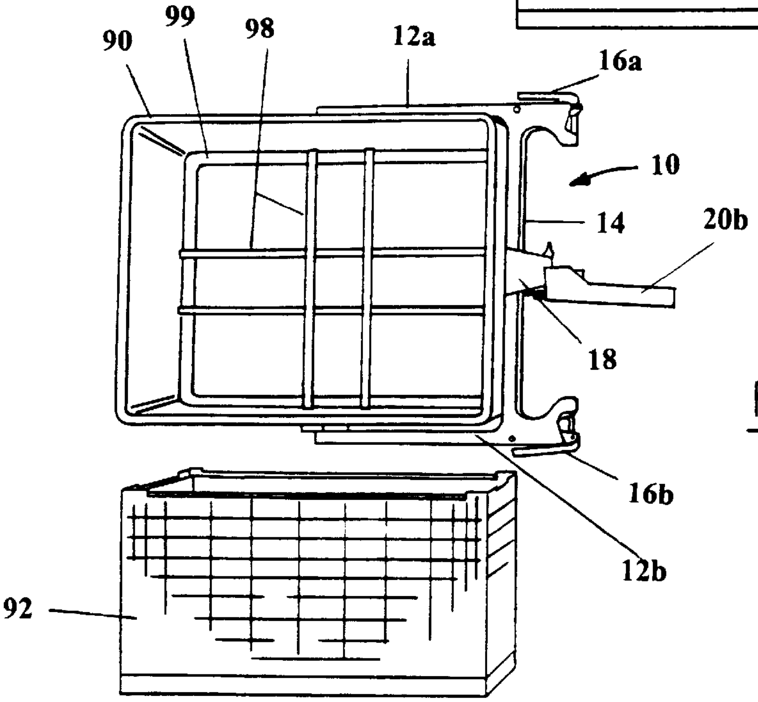
Figure 13:
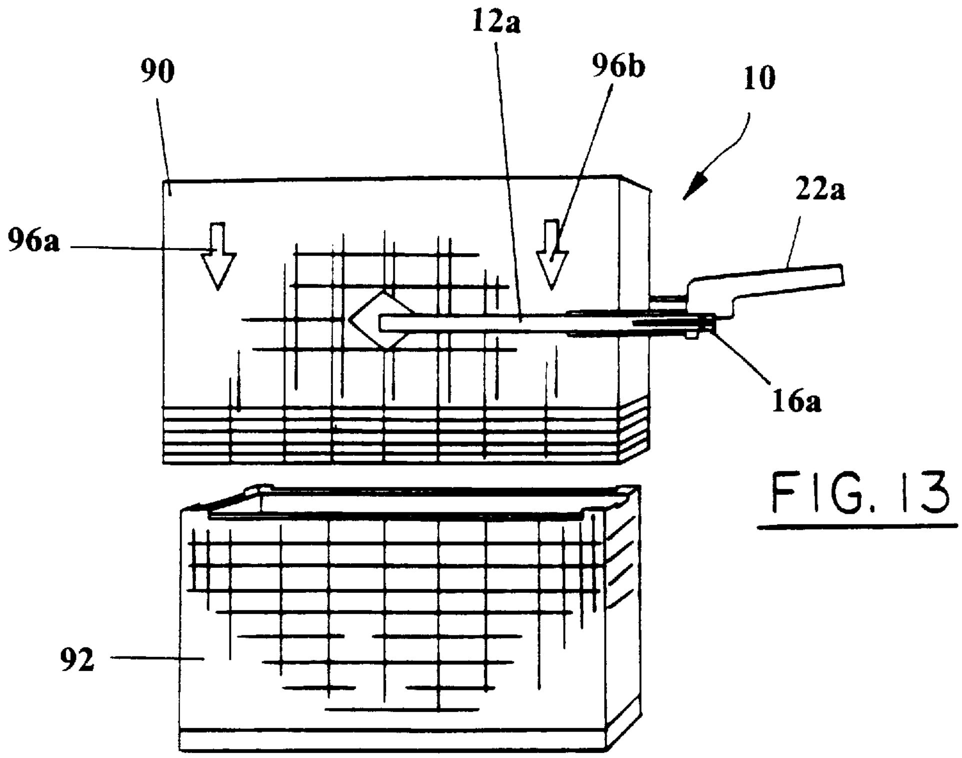
Figure 14:
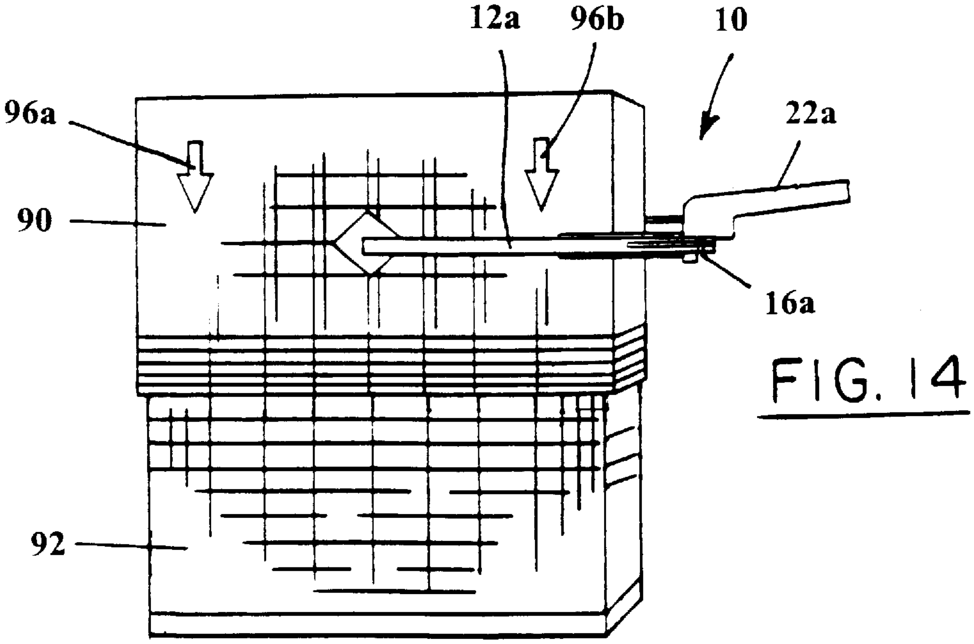

Referring to FIGS. 10 through 14, there are shown the series of steps involved in removing a first seed box 90 from the stored position on a second seed box 92 and positioning the two seed boxes in a stacked configuration for receiving and storing seeds. The first seed box 90 is open at the top and bottom and is larger in length and width than the second seed box 92. The second seed box 92 is open at the top and closed at the bottom. Shown in FIG. 10 is the first seed box 90 positioned over the second seed box 92 in a nested configuration such as for storage. The first seed box 90 is engaged by the seed box inverter 10 as previously described for lifting the first seed box upward in the direction of arrows 94*a* and 94*b*. The first seed box 90 is raised above and clear from the second seed box 92 as shown in FIG. 11 to a height to permit the first seed box to be rotationally displaced about a horizontal axis passing through the inverter's releasable pivot mechanism (not shown in the figures for simplicity) as previously described. Pivoting rotation of the first seed box 90 is shown in FIG. 12, where the first seed box has been rotated 90° from its orientation in FIGS. 10 and 11. As shown in FIG. 12, the first seed box 90 includes open upper and lower portions, with a combination of an inner peripheral rib 99 and plural spaced slats 98 connected to the inner rib disposed in a lower portion of the first seed box. Continued rotation of the first seed box 90 by the seed box inverter 10 positions the open upper and lower portions of the seed box in vertical alignment as shown in FIG. 13. The first seed box 90 is then lowered by the seed box inverter 10 in the direction of arrows 96*a* and 96*b* so as to rest upon an upper portion of the second seed box 92 as shown in FIG. 14. In the stacked configuration shown in FIG. 14, the first seed box's inner rib 99 rests upon the upper peripheral edge of the second seed box 92. The spaced slats 98 add strength to the lower portion of the first seed box 90 so that it securely and stably rests upon the upper peripheral edge of the second seed box 92. The stacked array of the first and second seed boxes 90, 92 is capable of storing a large quantity of seed as both boxes may be filled in this configuration. When empty, the procedure is reversed permitting the first seed box 90 to be removed from an upper portion of the second seed box 92, inverted and positioned on the second seed box in a nested configuration as shown in FIG. 10 for storage.

By making the distance between the seed box inverter's releasable pivot mechanism 18 and the first and second side arms 12*a*, 12*b* unequal so as to provide an off-center lifting arrangement, the upraised seed box can be made to automatically rotate about the axis of the releasable pivot mechanism to assume either an upright or inverted orientation. This eliminates the need for manually urging the upraised seed box in a direction of rotation for changing it orientation. While this is not an essential feature of this invention, it may under certain circumstances be desirable to incorporate this feature.

Figure 15:
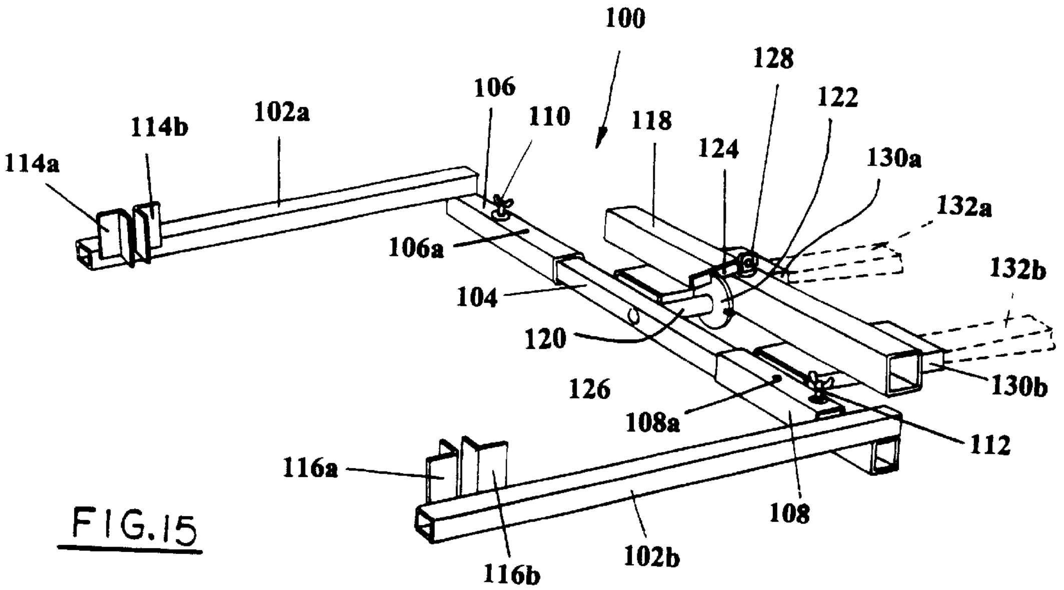
FIG. 15 is a perspective view of yet another embodiment of a seed box inverter in accordance with the present invention.
Figure 16:
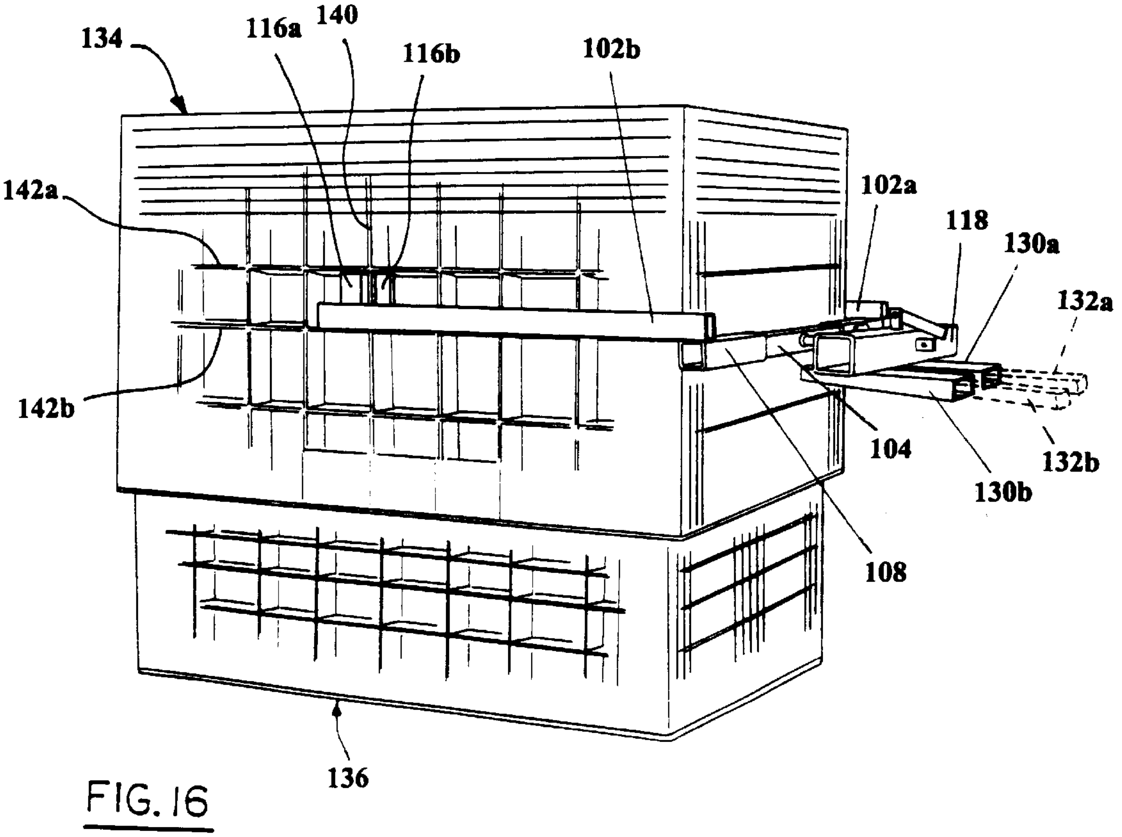
FIG. 16 shows the manner in which the seed box inverter of FIG. 15 engages and lifts a seed box.

Referring to FIG. 15, there is shown a perspective view of another embodiment of a seed box inverter 100 in accordance with the principles of the present invention. The manner in which the seed box inverter 100 engages and lifts a first seed box 134 disposed on a second seed box 136 is shown in FIG. 16. Seed box inverter 100 includes a first cross member 104 having disposed on respective ends thereof first and second telescoping outer members 106 and 108. Attached to the distal end of the first telescoping outer member 106 is a first side arm 102*a*. Similarly, attached to a distal end of the second telescoping outer member 108*a* is a second side arm 102*b*. Each of the first cross member 104, first and second telescoping outer members 106, 108, and first and second side arms 102*a*, 102*b* is preferably comprises of a high strength tubular steel. The first and second telescoping outer members 106, 108 are free to move along the length of the first cross member 104 so as to adjust the width of the seed box inverter 100 in accordance with the width of a seed box to be lifted. Disposed on the distal end of the first side arm 102*a* are first and second brackets 114*a* and 114*b*. Similarly, disposed on the distal end of the second side arm 102*b* are third and fourth brackets 116*a* and 116*b*. Each of the first and second and the third and fourth brackets are arranged in a spaced manner along the length of their respective side arm so as to provide a slot between the adjacent brackets. Thus, as shown for the case of the third and fourth brackets 116*a*, 116*b* attached to the second side arm 102*b*, a vertical rib 140 disposed on the outer surface of a lateral wall of the first seed box 134 is inserted between the third and fourth brackets. The third and fourth brackets 116*a*, 116*b* are positioned in a tight-fitting manner between first and second spaced horizontal ribs 142*a* and 142*b*. In this manner, the first seed box 134 may be securely engaged by respective pairs of brackets on each of the first and second side arms for lifting and positioning the seed box in a manner which prevents rotation or sliding displacement of the seed box relative to the seed box inverter 100. Plural spaced apertures 106*a* are disposed in the first telescoping outer member 106. Similarly, plural spaced apertures 108*a* are disposed in and along the length of the second telescoping outer member 108. Corresponding spaced apertures are disposed in each end of the first cross member 104 to permit insertion of first and second set screws, or bolts, 110 and 112 into pairs of aligned apertures for securely maintaining each of the telescoping outer members in fixed position on a respective end of the first cross member 104. In this manner, the width of the seed box inverter 100 may be adjusted to accommodate a range of widths of seed boxes.

Disposed in the center of the first cross member 104 is an aperture for receiving an elongated, linear pivot shaft 120. A second, opposed end of the pivot shaft 104 is inserted through an aperture in a second cross member 118. Respective ends of the pivot shaft 120 are securely attached to the first and second cross members 104, 118 by conventional means such as weldments or a connecting collar (not shown for simplicity). Attached to an upper portion of the second cross member 118 by means of a mounting bracket 128 is a latching arm 124. Latching arm 124 is pivotally attached to the mounting bracket 128, permitting the latching arm to be moved upwardly or downwardly in a vertical plane about the mounting bracket. Also attached to the pivot shaft 120 is a generally circular positioning bracket 122. Disposed about the periphery of the positioning bracket 122 in a spaced manner are plural notches, or slots, 126, each of which is adapted to receive the latching arm 124 when positioned above and in vertical alignment with the pivot shaft 120. By moving the latching arm 124 into one of the notches 126 disposed about the periphery of the positioning bracket 122, the combination of the first cross member 104 and first and second side arms 102*a*, 102*b* and a seed box engaged by the side arms may be maintained in a fixed orientation after being rotationally displaced about the axis of the pivot shaft 122. This permits an upright seed box engaged and lifted by the seed box inverter to be rotated 180° so as to assume an inverted orientation. Attached in a spaced manner by conventional means such as weldments to the second cross member 18 are first and second attachment brackets 130*a* and 130*b*. The first and second attachment brackets 130*a*, 130*b* are respectively adapted to receive first and second forks 132*a* and 132*b* in a tight-fitting manner permitting the seed box inverter 100 and a seed box engaged by the seed box inverter to be lifted, manipulated and positioned as desired.

Figure 17:
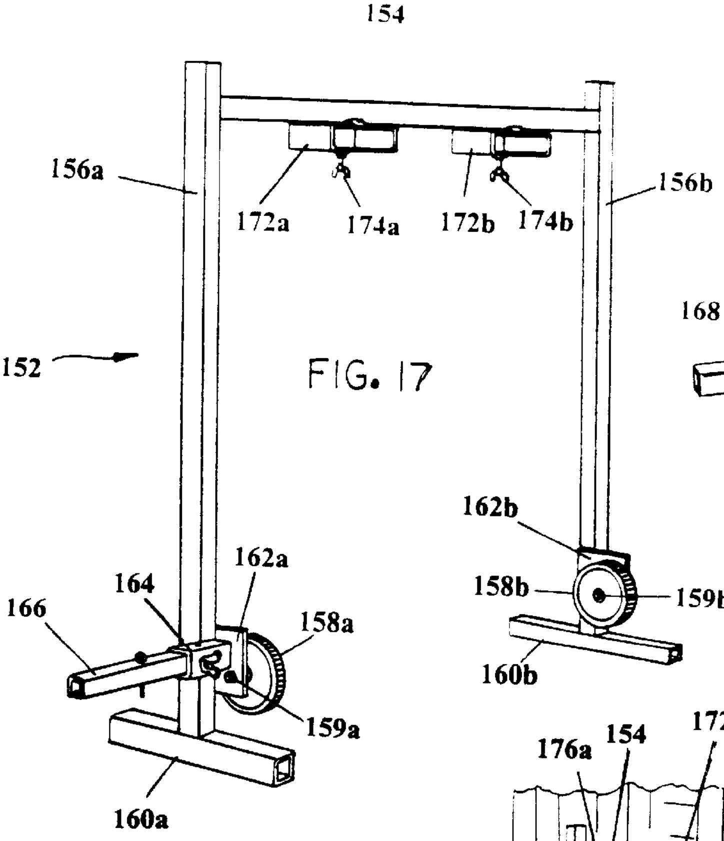
FIG. 17 is a perspective view of another embodiment of a seed box inverter in accordance with the principles of the present invention.
Figure 18:
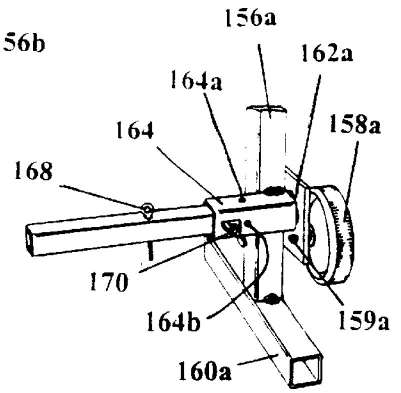
FIG. 18 is a perspective view of a portion of the seed box inverter of FIG. 17 showing the manner in which one of the box engaging wheels may be moved inwardly or outwardly to accommodate a range of seed box widths.

Referring to FIG. 17, there is shown a perspective view of another embodiment of a seed box inverter 152 in accordance with the present invention. Seed box inverter 152 includes first and second generally vertical side arms 156*a* and 152*b* each attached to a respective end of a cross member 154. Disposed on respective lower end portions of the first second side arms 156*a*, 156*b* are first and second base members 160*a* and 160*b*. The first and second base members 160*a*, 160*b* provide support for the seed box inverter 152 when positioned on a generally flat surface so that the seed box inverter maintains a generally vertical, upright position as shown in FIG. 17. Each of the side arms, base members, and cross member are preferably comprised by high strength tubular steel, with connections between the adjacent structural members provided by conventional means such as weldments.

Positioned on opposed lower portions of the seed box inverter 152 are first and second wheels 158*a* and 158*b*. The second wheel 158*b* is securely attached to a lower portion of the second side arm 156*b* by means of an axle 159*b* and a mounting bracket 162*b*. The first wheel 158*a* is attached to an end of an adjusting tube 166 by means of an axle 159*a* and another mounting bracket 162*a*. Adjusting tube 166 is inserted through a positioning bracket 164 which is mounted to a lower portion of the first side arm 156*a*. Adjusting tube 166 can be displaced in a telescoping manner through positioning bracket 164. In this manner, the distance between the first and second wheels 158*a*, 158*b* may be adjusted to accommodate the width of a seed box engaged by the wheels in a manner described below. Plural spaced apertures are disposed within and along the length of each of the positioning bracket 164 and adjusting tube 166 for receiving a locking pin 170 to securely maintain the first wheel 158*a* a selected distance from the second wheel 158*b*. Attached in a spaced manner to cross member 154 are first and second attachment brackets 172*a* and 172*b*. Each of the first and second attachment brackets 172*a*, 172*b* is adapted to receive in tight-fitting engagement a respective fork such as of a forklift to permit the seed box inverter 152 to be lifted and positioned as desired for lifting a seed box as described below. Set screws 174*a* and 174*b* are respectively inserted through apertures in the first and second attachment brackets 172*a*, 172*b* for tightly engaging a respective fork inserted in an associated attachment bracket.

Figure 19:
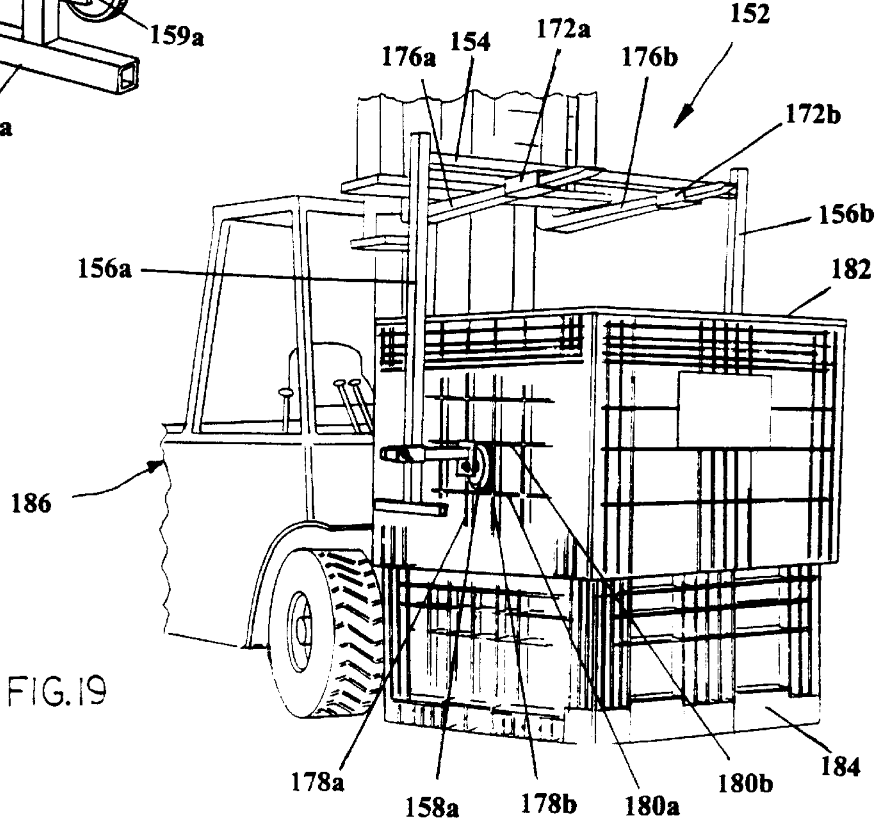
FIG. 19 is a perspective view showing the manner in which the seed box inverter of FIG. 17 engages the outer surfaces of opposed lateral walls of a seed box for lifting, orienting and positioning the seed box as desired.

Referring to FIG. 19, there is shown a perspective view of the seed box inverter 152 engaging and lifting a first seed box 182 disposed on a second seed box 184. As indicated above, the first and second attachment brackets 172*a*, 172*b* mounted to the cross member 154 are adapted to receive in tight-fitting relation respective forks 176*a* and 176*b* of a forklift 186. The first and second seed boxes 182, 184 are each provided with plural spaced vertical and horizontal ribs on the outer surfaces of their four lateral walls. Each of the wheels, as shown for the case of the first wheel 158*a* in FIG. 19, is adapted for positioning between adjacent pairs of vertical ribs 178*a* and 178*b* and adjacent pairs of horizontal ribs 180*a* and 180*b* disposed on the outer surface of a lateral wall of the first seed box 182. By securely positioning each of the wheels in contact with opposed lateral walls of the first seed box 182 and between adjacent spaced vertical and horizontal ribs, the seed box inverter 182 is capable of lifting of the first seed box 182 as the first and second forks 176*a* and 176*b* are raised. Each of the first and second wheels 158*a*, 158*b* is freely rotatable with respect to its associated mounting bracket.

Figure 20:
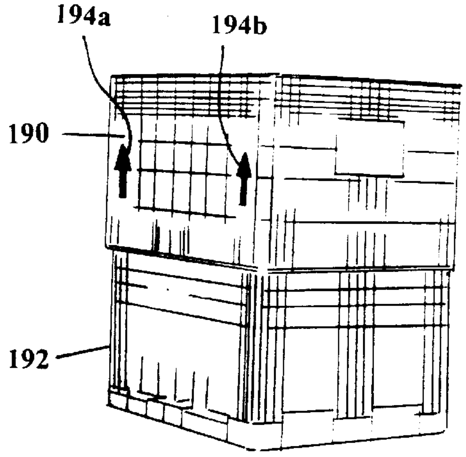
FIGS. 20 through 24 show the sequence of steps involved in changing the position of a first seed box from a stacked configuration on a second seed box for receiving and storing seed to a nested configuration on the second seed box for storage after use using the inventive seed box inverter of FIG. 17.
Figure 21:
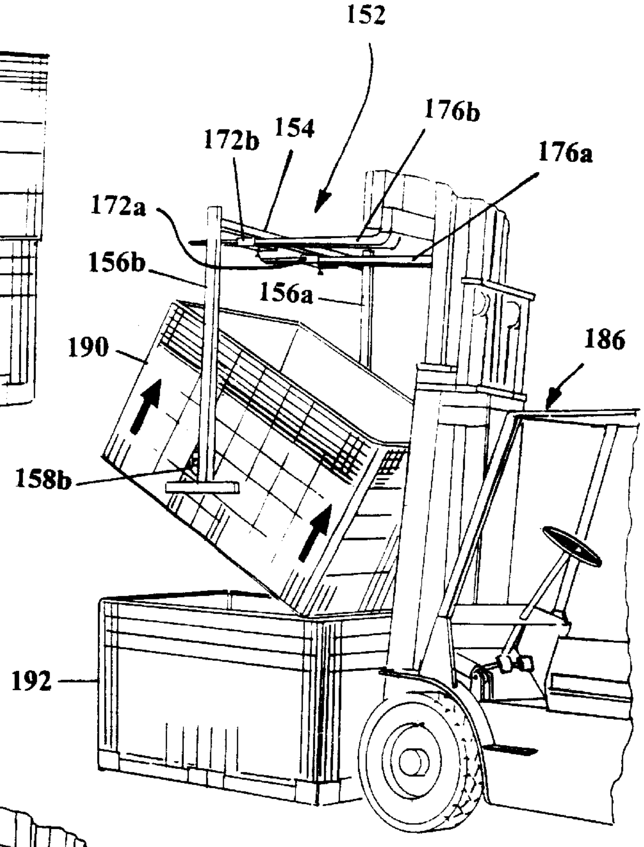
Figure 22:
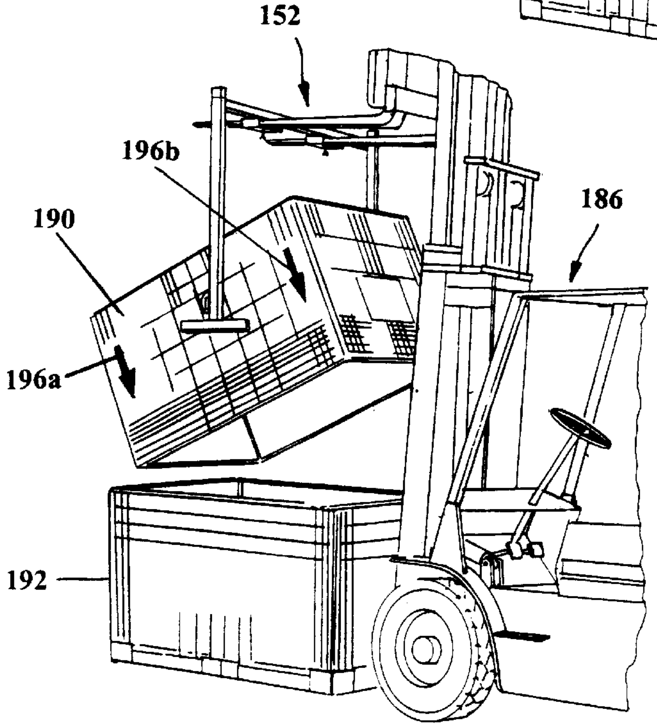
Figure 23:
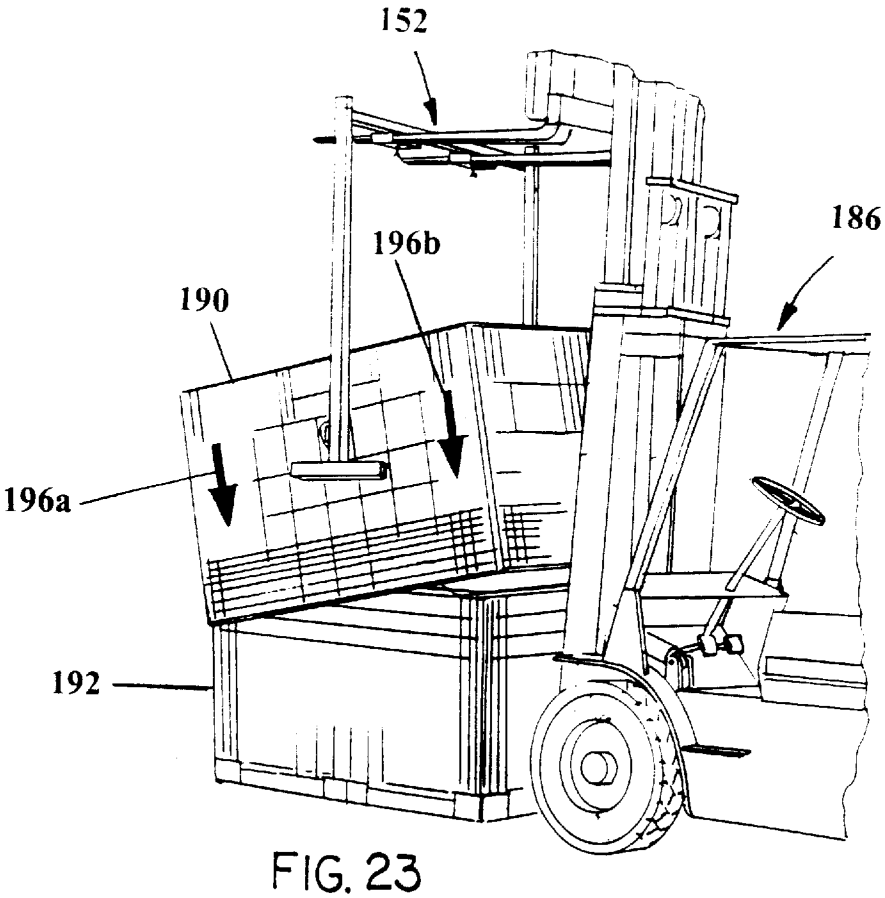
Figure 24:
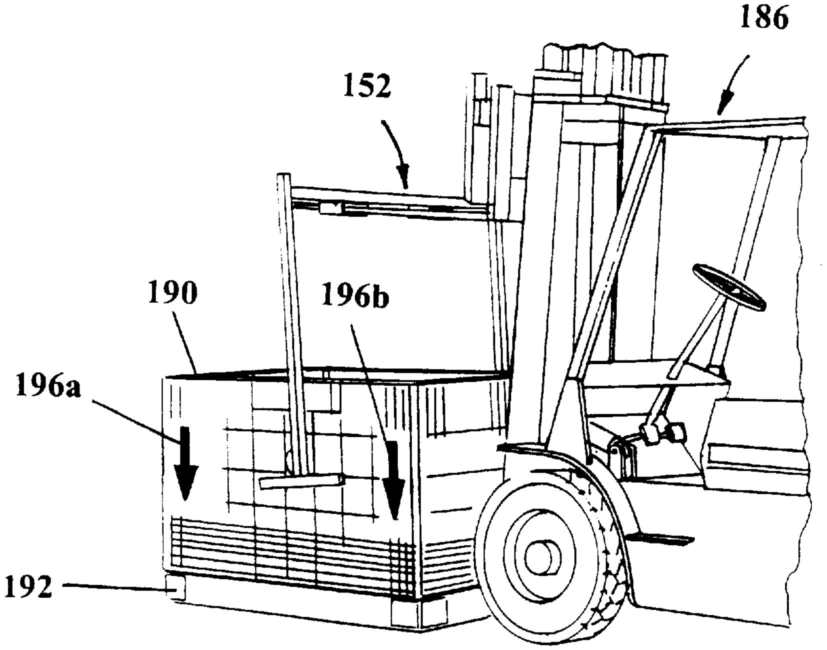

The operation of the seed box inverter 152 in lifting a first seed box 190 from a second seed box 192 when arranged in a stacked configuration will now be described with reference to FIGS. 20–24. As shown in FIG. 20, the first and second seed boxes 190, 192 are arranged in a stacked configuration for receiving and storing seed. The seed box inverter 152 of the present invention in conjunction with a lift device such as a forklift or end loader is capable of lifting the first seed box 190 resting on the second seed box 192 in the direction of arrows 194*a* and 194*b*. The first seed box 190 is raised to a height to allow it to clear the second seed box 192 when rotated with the first and second wheels 158*a* and 158*b* engaging respective opposed lateral walls of the seed box. As shown in FIG. 21, the wheels engage the sidewalls of the first seed box 190 in an off-center manner to permit the seed box to pivot about an axis passing through the two wheels. Because the two wheels engage opposed lateral walls of the first seed box 190 at off-center positions located toward one of the box's end wall and also engage the box's lateral walls below a plane passing midway between the upper and lower edges of the box, the first seed box will rotate so as to assume an inverted position as shown in FIG. 22 with its open upper portion directed downwardly toward the second seed box 192. The first seed box 190 is then lowered in the direction of arrows 196*a* and 196*b* by the lowering of the two forks and the seed box inverter 152 attached thereto. The second seed box 194 is then inserted into the open inverted top portion of the first seed box 190 which is lowered in the direction of arrows 196*a* and 196*b* to assume a nested configuration for storage as shown in FIG. 24. In this configuration, the first seed box 190 is disposed over and substantially encloses the second seed box 192. This procedure may be reversed by lifting the first seed box 190 from its nested location over the second seed box 192 and allowing the first seed box to pivot with the pair of wheels so as to assume an upright orientation, whereupon the first seed box may be lowered onto the upper edge portion of the second seed box to assume the stacked configuration of FIG. 20 for receiving and storing seed. The first seed box 190 can be caused to automatically pivot and assume a generally upright orientation for stacking on the second seed box 192 by proper positioning of the pivoting wheels on the opposed lateral walls of the first seed box 190.

While particular embodiments of the present invention have been shown and described, it will be obvious to those skilled in the relevant art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use with a pair of fork elements attached to a lift device, apparatus for lifting a generally box-like first container adapted for positioning on a generally box-like second container in a first stacked configuration wherein said first container is upright for receiving and storing material or in a second nested configuration wherein said first container is inverted and said second container is disposed in an open upper portion of the inverted first container, said first container having first and second opposed lateral walls with plural spaced ribs disposed on respective outer surfaces thereof, said apparatus comprising:

- a frame comprising a cross member and first and second side arms each attached to a respective opposed end of said cross member;
- first and second attachment brackets affixed to said frame and adapted to receive a respective fork element of the lift device for lifting said frame;

first and second engaging members respectively disposed on said first and second side arms for securely engaging respective ribs on the outer surfaces of first and second lateral walls of the first container;

pivot means coupled to said frame for permitting rotation of the first container when lifted between the upright and inverted orientations for positioning on the second container in the first stacked configuration or the second nested configuration; and first and second locking mechanisms pivotally coupling said first and second side arms to respective ends of said cross member, wherein said engaging members contact respective ribs on lateral walls of the first container with said side arms in a first retracted position and are displaced from said ribs with said side arms in a second extended position, wherein each of said locking mechanisms includes a handle for manual manipulation and first and second latches for locking a respective side arm in said first retracted position or said second extended position.

2. The apparatus of claim 1 wherein the ribs on the outer surfaces of the lateral walls of the first container include spaced vertical and horizontal ribs arranged in a matrix array, and wherein each of said first and second engaging members engages one or more vertical and horizontal ribs.

3. The apparatus of claim 2 wherein each of said engaging members includes plural projections arranged in a spaced manner to form vertical and horizontal slots for receiving and engaging vertical and horizontal ribs, respectively.

4. The apparatus of claim 1 wherein said first and second attachment brackets are open at one end and include an open inner portion extending along at least a portion of the length thereof for receiving a respective fork inserted therein.

5. The apparatus of claim 4 wherein the open inner portion of each attachment bracket is tapered for engaging a fork inserted therein in a tight-fitting manner.

6. The apparatus of claim 1 further comprising a flexible coupler connecting said frame to the lift device for preventing removal of said attachment brackets from the forks during lifting of the first container.

7. The apparatus of claim 6 wherein said flexible member comprises a chain having a first end connected to an attachment bracket and a second end connected to the lift device.

8. The apparatus of claim 1 wherein said first and second latches include biasing means for urging a handle to a locked position for locking an associated side arm in said first retracted position or said second extended position.

9. The apparatus of claim 8 wherein said biasing means comprises a coiled spring.

10. The apparatus of claim 1 wherein each of said first and second locking mechanisms is an off-center locking mechanism.

11. The apparatus of claim 1 further comprising first and second pivot pins for connecting a respective handle of said first and second locking mechanisms to a respective end of said first cross member.

12. The apparatus of claim 1 further comprising a second cross member coupled to said first and second attachment brackets, wherein said pivot means is coupled to said first and second cross members for permitting rotation of said first cross member and said first and second side arms relative to said second cross member and said attachment brackets.

13. The apparatus of claim 12 wherein said first and second cross members are connected by said pivot means in an off-center manner to allow said frame and a first container lifted thereby to rotate about said pivot means under the weight of said first container.

14. The apparatus of claim 12 wherein said first pivot means includes a pivot pin connecting said first and second cross members.

15. The apparatus of claim 14 wherein said pivot means further includes a generally circular, disc-like bracket connected to said first cross member and having first and second spaced notches disposed about its periphery and a locking shaft pivotally coupled to said second cross member and adapted for positioning in said first notch for maintaining said first container upright and in said second notch for maintaining said first container inverted.

16. The apparatus of claim 15 further comprising biasing means for urging said locking shaft in contact with said generally circular bracket and into said first or second notch when aligned therewith.

* * * * *